United States Patent Office 3,443,012
Patented May 6, 1969

3,443,012
PESTICIDAL USES OF THIOSUBSTITUTED
PHENOLS
Edward D. Weil, Lewiston, and Hans L. Schlichting, Grand Island, N.Y., assignors to Hooker Chemical Corporation, Niagara Falls, N.Y., a corporation of New York
No Drawing. Original application Mar. 4, 1963, Ser. No. 262,375, now Patent No. 3,336,393, dated Aug. 15, 1967. Divided and this application Dec. 2, 1966, Ser. No. 619,085
Int. Cl. A01n 9/36; C07f 9/02
U.S. Cl. 424—225
9 Claims

ABSTRACT OF THE DISCLOSURE

A method for the control of undesirable pests, such as fungi, mites, beetles and flies, comprises applying a toxic amount of a particular type of thiosubstituted phenol to the locus of the pest. The thiophenol employed is of the formula:

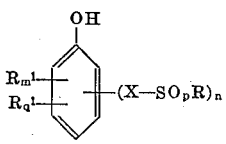

In this formula, X is alkylene of 2 to 8 carbon atoms; $R^1$ is lower alkyl; $R^2$ is halogen; R is either hydrogen, hydrocarbyl or acyl; and $n$ is 1 or 2; $m$ is from 0 to 4, inclusive; $q$ is from 0 to $5-(m+n)$, inclusive; $p$ is from 0 to 2, inclusive; $p$ is 0 when R is other than hydrocarbyl; and the sulfur atom is separated from the phenol nucleus by at least two carbon atoms.

This is a division of our application S.N. 262,375, filed Mar. 4, 1963, now U.S. Patent 3,336,393, granted Aug. 15, 1967.

This invention relates to novel compositions of matter and to processes for producing them. More specifically the present invention is concerned with novel phenolic sulfides and to processes for the preparation thereof.

The novel compositions of the instant invention are best represented by the following formula:

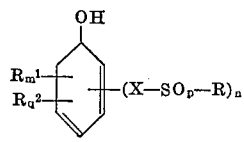

wherein the substituent X is an alkylene radical of at least two carbon atoms, but preferably three to eight carbon atoms, the $R^1$ substituent is lower alkyl, the $R^2$ substituent is halogen, R is a substituent selected from the group consisting of hydrogen, hydrocarbyl, acyl, and mixtures thereof, $n$ is an integer from one to two inclusive, $m$ is an integer from 0 to 4 inclusive, $q$ is an integer from 0 to $5-(m+n)$ the integer $p$ is 0 when the substituent R is other than hydrocarbyl, the sulfur atom being separated from the phenol nucleus by at least two carbon atoms, but preferably by 3 to 8 carbon atoms.

The alkylene radical X may be either unsubstituted or substituted by lower alkyl, hydrocarbyloxymethyl, hydrocarbylthiomethyl, 2-(hydrocarbyloxy)ethyl, 2-(hydrocarbylthio)ethyl radicals, or hydrocarbyloxy radicals.

The term "hydrocarbyl" as used herein represents the radical obtained by removal of a hydrogen atom from a hydrocarbon, and thus encompasses alkyl, alkenyl, cycloalkyl, phenyl, naphthyl, alkylphenyl, other aryl, benzyl, and other arylalkyl. While no necessary limitations are imposed by the chemistry of the invention upon the size of the hydrocarbyl radical, for economic and other reasons the preferred hydrocarbyl radicals are those having from 1 to about 20 carbon atoms.

Consequently, the term "alkyl" as used herein has no chemically-imposed upper limit but for economic and other reasons alkyl radicals of from 1 to about 20 carbon atoms are preferred. The term "lower alkyl" as used herein refers to alkyl radicals having from 1 to 6 carbon atoms.

The term "acyl" as used herein has its ordinary meaning, that is, the radical derived by removal of OH from an acid. Here also there is no chemically imposed upper limit but for economic reasons acyl radicals of from 1 to 20 carbon atoms are preferred.

Illustrative examples of X substituents include

—$CH_2CH_2$—,  —$CH_2CH_2CH_2$—,  —$CH(CH_3)CH_2$—,
—$CH_2CH(CH_3)$—,  —$CH(CH_3)CH(CH_3)$—

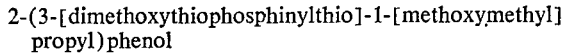
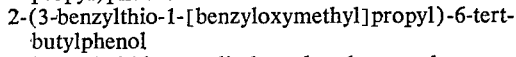
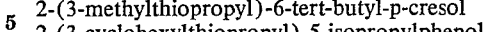
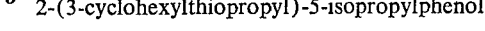

—CH(CH₃)CH₂CH(OCH₃)— and the like.

Illustrative examples of the R¹ substituents include methyl, ethyl, n-propyl, isopropyl, n-butyl, sec-butyl, isobutyl, tert-butyl, n-amyl, 1-methylbutyl, isoamyl tert-amyl, 1-ethylpropyl, and hexyl, as well as other lower alkyl, where $m>1$, the R¹ groups may be alike or different.

Examples of the group R² are fluorine, chlorine, bromine, and iodine, where $q>1$, the R² groups may be alike or different.

Examples of the R substituent include hydrogen, methyl, ethyl, propyl, isopropyl, n-butyl, isobutyl, sec-butyl, tert-butyl, amyl, hexyl, cyclohexyl, octyl, nonyl, decyl, dodecyl, octadecyl, allyl, methoxyethyl, hydroxyethyl, chloropropyl, phenyl, tolyl, tert-butylphenyl, p-chlorophenyl, 2,4,5 - trichlorophenyl, benzyl, 2 - phenylethyl, p-chlorobenzyl, acetyl, propionyl, butyryl, benzoyl, thiobenzoyl, cyano, N-methylcarbamoyl, N-methylthiocarbamoyl, N,N-dimethylcarbamoyl, N,N-dimethylthiocarbamoyl, other N- and N,N-di(hydrocarbyl)substituted carbamoyl and -thiocarbamoyl, dimethoxyphosphinyl, diethoxyphosphinyl, dimethoxythiophosphinyl, diethoxythiophosphinyl, other di(lower alkoxy) phosphinyl and —thiophosphinyl, and O-alkylthiocarbonyl, for example.

A preferred group of new phenols of the present invention possesses a high level of biological activity, a relatively lower cost and relatively greater ease of manufacture. This preferred group has the formula:

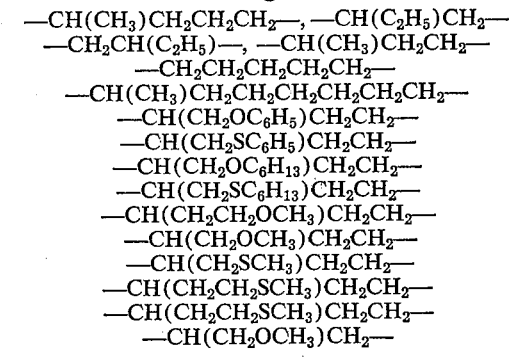

wherein the substituents R¹, R², R, $m$, and $p$ are as above defined, $q=4-m$, and R³ is selected from the group consisting of hydrogen, lower alkyl, lower-alkoxymethyl; and 2-(lower-alkoxy)ethyl.

Examples of compounds within this preferred group include the following:

2-(3-mercaptopropyl)phenol
2-(3-methylthiopropyl)-3,4,5,6-tetramethylphenol
2-(3-methylthiopropyl)-3,4,5,6-tetrachlorophenol
2-(3-methylthiopropyl)-4-bromophenol
2-(3-octadecylthiopropyl)-4-fluorophenol
2-(3-tolylthiopropyl)-4-iodophenol
2-(3-ethylthiopropyl)-4-hexylphenol
2-(3-ethylthio-1-[methoxymethyl]propyl)phenol
2-(3-methylthio-1-[2-methoxyethyl]propyl)phenol
2-(3-acetylthio-1-[2-butoxyethyl]propyl)phenol
2-(3-phenylthio-1-[hexyloxymethyl]propyl)-4-chloro-m-cresol 2-(3-[dimethoxythiophosphinylthio]-1-[methoxymethyl]propyl)phenol
2-(3-benzylthio-1-[benzyloxymethyl]propyl)-6-tert-butylphenol
2-(3-methylthiopropyl)-6-tert-butyl-p-cresol
2-(3-cyclohexylthiopropyl)-5-isopropylphenol as well as examples given in more detail hereinafter.

Illustrative examples of the broader group of compounds of the present invention include: 2-(1-methyl-7-methylthioheptyl)phenol, 4 - (3 - cyclohexylthiomethyl)phenol, 2-(2-ethylthioethyl)phenol, 2,6 - di(3 - methylsulfinylmethyl)phenol.

While methods have been available in the past for preparing phenols possessing sulfide substituents attached directly to the ring or separated from the ring by one carbon atom, there have been no methods for the synthesis of phenols possessing sulfide substituents separated from the ring by two or more carbon atoms, and such phenols have not hitherto been known nor their valuable properties anticipated.

Furthermore, although there are many examples of the addition of RSH to simple olefins, no examples have been known of the addition of RSH to unsaturated phenols. In fact phenolic compositions are well known inhibitors of free radical additions and have been known to inhibit the addition of RSH to simple olefins.

Surprisingly, the novel compositions of the present invention wherein the integer $p$ is 0 are readily prepared by the addition, in the presence of a free radical catalyst, of thiol compositions having the formula RSH, wherein R is a substituent as defined herein, to alkenylphenols of the following formula

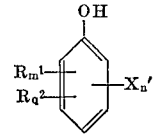

where the X′ substituent represents an alkenyl radical corresponding to X and differing from X only in that X′ possesses a carbon to carbon double bond; and R¹, R², $m$, $q$, and $n$ are as defined herein.

The preferred group of compositions of the present invention are derived from o-allylphenols of the following formula:

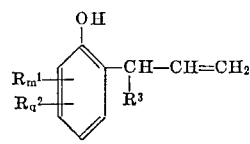

wherein the substituents R¹, R², R³ and the integers $m$ and $q$ are as defined herein. When the substituent R³ is lower alkoxymethyl or 2-(lower-alkoxy)ethyl, the unsaturated phenols are prepared as described in our copending application Ser. No. 260,076, filed Feb. 20, 1963.

The novel process of the present invention to prepare the phenols wherein the integer $p$ is 0 is conducted by admixing the desired thiol RSH with the side-chain unsaturated phenol described above and subjecting said mixture to free radical reaction-initiating conditions amongst which are: heating; exposure to actinic light; addition of a free-radical catalyst, or combinations of these initiating conditions. Reaction conditions utilizing actinic light and/or free-radical catalysts are preferred where R— is other than O,O-dialkoxythiophosphinyl but where R is O,O-dialkoxythiophosphinyl, purely thermal initiation is preferred. Where the unsaturated chain group X' in the phenolic starting material has the double bond located $\alpha,\beta$-(i.e. adjacent) to the phenol ring, the group RS becomes attached to the $\beta$ carbon atom and the H-atom of the thiol RSH becomes attached to the $\alpha$-carbon atom, regardless of method of initiation and regardless of the nature of R. Where the group X' in the phenolic starting material has the double bond in the $\beta,\gamma$ position and said double bond is terminal, then the RS group becomes attached to the terminal ($\gamma$) carbon atom and the H becomes attached to the penultimate ($\beta$) carbon atom when the reaction is initiated by light or free radical catalysts. However, when the reaction is initiated by thermal means, as in the case of the O,O-dialkylphosphorodithiolates, the addition may go in both directions to some degree, giving a mixture of isomers, but giving predominantly the isomer having the RS group on the terminal carbon atom.

Where the double bond in X' is $\beta,\gamma$ or further removed from the phenol ring but not terminal, the addition generally goes both ways, to yield a mixture. Suitable free radical catalysts include organic peroxides such as benzoyl peroxide, acetyl peroxide, cumene hydroperoxide, and in general any organic compound of the structure QOOH or QOOQ where Q is a monovalent organic radical, also azo compounds of the type Q—N=N—Q such as azobisisobutyronitrile, or any other organic compound which at suitable reaction temperatures, in the range of $-40°$ to $+250°$ centigrade, breaks down to give free radicals. Inorganic free radical generators such as hydrogen peroxide or oxygen may also be used.

As indicated, the reaction may be conveniently run in the range of $-40°$ to $+250°$ centigrade although somewhat higher or lower temperatures are not precluded. A preferred temperature range is $-20°$ to $200°$ centigrade. Atmospheric pressure is convenient although sub- or super-atmospheric pressures are workable. When a gaseous RSH compound such as methyl mercaptan is employed, moderately superatomspheric pressures may be advantageous to hold the mercaptan in the liquid phase. When RSH is $H_2S$, superatmospheric pressures are advantageous.

No solvent is generally required although the use of an inert solvent is possible. Suitable inert solvents are hydrocarbons such as benzene, heptane, petroleum ether, toluene, or the like, chlorinated hydrocarbons such as methylene chloride, ethylene chloride, chlorobenzene, or the like, alcohols such as methanol or phenol, ketones such as acetone, esters such as ethyl acetate, or an access of one or the other reactant or product serving as solvent.

The novel compounds wherein $p$ is 1 or 2 are conveniently prepared from the corresponding phenols where $p$ is 0 by oxidation utilizing one or two molar equivalents, respectively, of any suitable sulfide oxide agent such as hydrogen peroxide, peracetic acid, performic acid, perbenzoic acid, chromic acid, molecular oxygen in the presence of a catalyst (such as $N_2O_4$), or other oxidants capable of oxidizing sulfides.

The products of the invention may be isolated by distillation, fractional crystallization (where they are solids) or by differential extraction. In the latter case, what is meant is that an alkaline extraction medium such as aqueous sodium carbonate or caustic may be employed to leach out the relatively more acidic unreacted or excess RSH from the relatively less acidic phenolic product.

The phenols of the invention are highly active germicides, antioxidants, fungicides, miticides, insecticides, and insect repellents. They are also useful chemical intermediates, for example for preparation of pesticidal esters and ethers, in particular the carbamates described in our copending application filed on even date herewith. Also of considerable insecticidal value are the O,O-di(lower-alkyl) phosphates and thiophosphates of the phenols of the invention. Also of value as insect repellents are the O-acyl and O-alkyl derivatives of the phenols of the invention, possessing in many cases a higher degree of repellent activity than the parent phenol.

Also of pesticidal value as herbicides are the mono- and dinitration products of those phenols of the invention having unsubstituted ortho and/or para positions prior to nitration.

Also included in the present invention are the corresponding salts of the phenol compounds such as the sodium, potassium, zinc, lead and barium salts. The salts can be prepared by reacting the appropriate phenol with the appropriate base such as NaOH. The salts are useful as chemical intermediates, oil additives and fungicides.

It is, of course, appreciated that the non-metallic salts are also included within the scope of the invention such as the triethylammonium salt and the like.

To further illustrate without intending to limit the invention, the following examples are given.

Example 1

In a vessel fitted with a cooling jacket, stirrer and a light well for irradiating the contents with mercury vapor light were placed 50 parts by weight of o-allylphenol and 0.5 part of azobisisobutyronitrile catalyst. The vessel was purged with nitrogen, then pressured with methyl mercaptan. Over two and one-half hours, 18 parts of methyl mercaptan was fed into the vessel while stirring, irradiating the contents, and holding the temperature at 30 to 40 degrees centigrade. After addition was complete, the irradiation was continued at 40 degrees centigrade for 7 hours. The product mixture was then fractionally distilled to obtain 44 parts of o-(3-methylthiopropyl)phenol, boiling point 104 to 108 degrees centigrade (0.1 mm.) as well as a foreshot of recovered o-allylphenol which was recycled to the next batch.

*Analysis.*—Calculated for $C_{10}H_{14}OS$: Neutralization equivalent 182. Found: Neutralization equivalent 183.

Similar results, except for slightly lower conversion, were obtained omitting either the light or the azobisisobutyronitrile. The neutralization equivalent in this example as in all examples hereinafter was determined by potentiometric titration of the phenol in pyridine solution using 0.1 N tetrabutylammonium hydroxide in pyridine as the titrant, the end point being taken as the point of inflection on an automatically recorded graph of electrode millivoltage versus volume of added titrant.

Example 2

A mixture of 5 parts (by weight) of 2-allyl-5-methylphenol, 10 parts methyl mercaptan, and 0.1 part of azobisisobutylronitrile was exposed to the light of a mercury vapor lamp in a vessel fitted with a reflux condenser cooled to below the boiling point of methyl mercaptan. The reaction mixture was held at 30–40 degrees by external cooling. After seven hours, vacuum was applied to remove the unreacted methyl mercaptan. The remaining liquid was fractionally distilled, to obtain 5 parts of 2-(3-methylthiopropyl)-5-methylphenol, boiling point 108–110 degrees centigrade (0.1 millimeter).

*Analysis.*—Calculated for $C_{11}H_{16}SO$: Neutralization equivalent 198. Found: Neutralization equivalent 200.

Examples 3–25

The examples summarized in the following table were performed by the method of Example 2 (i.e. utilizing approximately 1 percent azobisisobutyronitrile as catalyst as well as mercury vapor light) except where otherwise indicated by footnotes.

| Ex. No. | Phenol used (wt.) | Thiol used (wt.) | Reaction temp. (°C.) | Reaction time (hrs.) | Wt. of product (g.) | Product | Characterization of product | Neutralization equivalent | | Other analytical data |
|---|---|---|---|---|---|---|---|---|---|---|
| | | | | | | | | Calcd. | Found | |
| 3 | 2-allylphenol (26.8 g.) | Ethyl mercaptan (20 g.) | 35 | 3½ | 25 | o-(3-ethylthiopropyl)phenol | Colorless liquid, B.P. 118–122° (0.1 mm.). | 200 | 199 | S, calcd., 16.0; found, 16.3. |
| 4 | ....do | n-Butyl mercaptan (18 g.) | 35 | 21½ | 29 | o-(3-n-butylthiopropyl)phenol | Colorless liquid, B.P. 132–8° (0.1 mm.). | 224 | 223 | S, calcd., 14.28; found, 14.18. |
| 5 | 2-allylphenol (13.4 g.) | n-Octyl mercaptan (15 g.) | 35 | 4½ | 18 | o-(3-n-octylthiopropyl)phenol | Colorless liquid, B.P. >100° (0.1 mm.). | 280 | 278 | S, calcd., 12.4; found, 12.5. |
| 6 | ....do | Dodecyl mercaptan (21 g.) (technical mix) | 35 | 4½ | 23 | o-(3-dodecylthiopropyl)phenol | Straw liquid, B.P. >100° (0.1 mm.). | 336 | 325 | S, calcd., 9.52; found, 8.89. |
| 7 | 2-allylphenol (26.8 g.) | t-Butyl mercaptan (18 g.) | 35 | 21½ | 10 | o-(3-t-butylthiopropyl)phenol | Colorless liquid, B.P. >98° (0.15 mm.). | 224 | 211 | S, calcd., 14.28; found, 13.78. |
| 8 | ....do | Thiophenol (22 g.) | 0 | 120 | 20 | o-(3-phenylthiopropyl)phenol | Yellowish liquid, B.P. 148–152° (0.1 mm.). | | | S, calcd., 13.1; found, 12.8. |
| 9 | 2-allylphenol (13.4 g.) | Benzyl mercaptan (13 g.) | 150 | ½ | 22 | o-(3-benzylthiopropyl)phenol | Colorless liquid, B.P. 168–172° (0.1 mm.). | | | S, calcd., 12.4; found, 12.5. |
| 10 | 2-allylphenol (10 g.)[1] | Thiolacetic acid (10 g.) | 25 | 10 | 14 | o-(3-acetylthiopropyl)phenol | Colorless liquid B.P. >120 (0.2 mm.). | 210 | 213 | S, calcd., 15.2; found, 16.1. |
| 11 | 2-allylphenol (13.4 g.)[1] | O,O-dimethylphosphorodithiolate (23 g.) | 100 | 16 | 22 | o-(dimethoxythiophosphinylthiopropyl)phenol | Yellowish liquid, B.P. >100 (0.2 mm.). | | | P, calcd., 10.6; found, 10.8. |
| 12 | ....do[1] | O,O-diethylphosphorodithiolate (27 g.) | 100 | 24 | 25 | o-(diethoxythiophosphinylthiopropyl)phenol | Yellowish liquid, B.P. >100 (0.2 mm.). | | | P, calcd., 9.7; found, 10.5. S, calcd., 19.4; found, 20.6. |
| 13 | 2-allyl-p-cresol (7 g.) | Methyl mercaptan (7 g.) | 50–90 | 4 | 5.4 | 2-(3-methylthiopropyl)-p-cresol | Colorless liquid, B.P. 118–120° (0.15 mm.). | 196 | 195 | |
| 14 | 2-allyl-4-chlorophenol (25 g.)[3] | Methyl mercaptan (30 g.) | 30–40 | 6.5 | 31 | 2-(3-methylthiopropyl)-4-chlorophenol | Colorless liquid, B.P. 132–4° (0.2 mm.). | 217.5 | 216 | |
| 15 | 2-allyl-3,5-xylenol (5 g.) | Methyl mercaptan (10 g.) | 30–40 | 7 | 3.8 | 2-(3-methylthiopropyl)-3,5-xylenol | Colorless liquid, B.P. 122–130° (0.2 mm.). | 210 | 208 | |
| 16 | 2,6-diallylphenol (7 g.) | ....do | 30–35 | 13 | 8.8 | 2,6-di(3-methylthiopropyl)-phenol | Light tan liquid, B.P. >100° (0.1 mm.). | 270 | 279 | |
| 17 | 2-allyl-3,5-diisopropylphenol (13.8 g.) | ....do | 30 | 6.5 | 6.6 | 2-(3-methylthiopropyl)-3,5-diisopropylphenol | Colorless solid, M.P. 57–9° | | | |
| 18 | 2-(1-propenyl)phenol (10 g.) | ....do | 20–30 | 6 | 9 | 2-(2-methylthiopropyl)phenol | Colorless liquid, B.P. 101–2° (0.05 mm.). | 182 | 182 | |
| 19 | 2-crotylphenol (20 g.) | ....do | 30 | 13 | 10 | 2-(3-methylthiobutyl)phenol | Colorless liquid, B.P. 105–114° (0.2 mm.). | 196 | 186 | |
| 20 | Mixture 2- and 4-(1-methyl-6-heptenyl)phenol (20 g.)[4] | ....do | 30 | 13 | 20 | Mixture 2- and 4-(1-methyl-7-methylthioheptyl)phenol | Light tan liquid, B.P. >150° (0.1 mm.). | 252 | 250 | |
| 21 | 2-allyl-3,4,6-trichlorophenol (18 g.) | Methyl mercaptan (18 g.) | 10–20 | 14 | 20 | 2-(3-methylthiopropyl)-3,4,6-trichlorophenyl | Yellowish liquid, B.P. >150° (0.1 mm.). | 285.5 | 283 | |
| 22 | 2-(1-methoxymethyl)phenol (10 g.) | Methyl mercaptan (10 g.) | 20–30 | 10 | 15 | 2-(3-methylthio-1-[methoxymethyl])phenol | Brownish liquid, B.P. >150° (0.1 mm.). | 226 | 222 | |
| 23 | 2-(1-phenoxymethyl)phenol (11 g.) | Methyl mercaptan (11 g.) | [4] 175–190 | 0.5 | 12 | 2-(3-methylthio-1-[phenoxymethyl]allyl)phenol | Brown syrup, B.P. >150° (0.1 mm.). | 288 | 278 | |
| 24 | 2-(1-methoxyethyl)allyl)phenol (8 g.) | Methyl mercaptan (8 g.) | −20 to −10 | 310 | 1.5 | 2-(3-methylthio-1-[2-methoxyethyl]allyl)phenol | Brownish oil, B.P. >150° (0.1 mm.). | 240 | 248 | |
| 25 | 2-(1-methylthiomethyl)allyl)phenol (20 g.) | Methyl mercaptan (10 g.) | 20–30 | 10 | 20 | 2-(3-methylthio-1-[methylthiomethyl]allyl)phenol | Yellowish oil, B.P. >150° (0.1 mm.). | 242 | 240 | |

[1] No azobisisobutyronitrile used. [2] No light used. [3] 0.5% benzoyl peroxide used in place of azobisisobutyronitrile. [4] Pressure vessel.

Example 26.—Preparation of o-(3-methylsulfinyl-propyl)phenol

To a solution of 20 parts of o-(3-methylthiopropyl) phenol in 50 parts of acetic acid was added slowly 13.9 parts of 30 percent aqueous hydrogen peroxide at 10–15 degrees centigrade over 30 minutes. The mixture was then stirred 2 hours at 20–30 degrees, then heated 20 minutes with steam. It was then stripped free of solvent at 100 degrees (0.1 millimeter pressure) leaving the product as 21, parts of clear viscous syrup, soluble in water. The infrared spectrum showed the characteristic sulfoxide band at 9.76 microns.

*Analysis.*—Calculated for $C_{10}H_{14}SO_2$: Neutralization equivalent, 198. Found Neutralization equivalent (non-aqueous potentiometric titration) 198.

Example 27.—Preparation of o-(3-methylsulfonyl-propyl)phenol

To a solution of 20 parts of o-(3-methylthiopropyl) phenol in glacial acetic acid was added slowly 28 parts of 30 percent aqueous hydrogen peroxide over 30 minutes at 5–10 degrees, then the mixture was warmed slowly to 100 degrees and held at 100 degrees for 60 minutes. It was stripped free of solvent at 100 degrees (0.1 mm.), the residue then taken up in benzene, the solution washed with sodium bicarbonate solution and then with water, and the benzene then stripped off under vacuum leaving behind the desired sulfone as a slightly colored viscous syrup.

*Analysis.*—Calculated for $C_{10}H_{14}SO_3$: Neutralization equivalent, 214. Found: Neutralization equivalent, 212.

Example 28.—Preparation of o-(3-ethylsulfinyl-propyl)phenol

In the manner of the above example, 10 parts of o-(ethylthiopropyl)phenol in 10 parts of acetic acid was reacted with 6.5 parts of 30 percent hydrogen peroxide to obtain the crude sulfoxide as a solid which was recrystallized from benzene-heptene to obtain 8.5 parts of colorless crystalline water-soluble solid, M.P. 99.5–101° centigrade. The infrered spectrum confirmed that the product was the desired sulfoxide on the basis of characteristic sulfoxide bands at 9.7–10 microns.

*Analysis.*—Calculated for $C_{11}H_{16}O_2S$: Neutralization equivalent 216. Found: Neutralization equivalent 214.

Example 29.—Preparation of o-(3-n-butylsulfinyl-propyl)phenol

In the manner of the preceding example, 10 parts of o-(3-n-butylthiopropyl)phenol was reacted with 5.8 parts of 29 percent hydrogen peroxide to obtain 8 parts of the desired sulfoxide as a colorless viscous syrup, showing the expected infrared sulfoxide bands at 9.7–10.0 microns.

Example 30.—Preparation of o-(3-n-octylsulfinyl-propyl)phenol

In the manner of the preceding example, 5 parts of o-(3-n-octylthiopropyl)phenol was reacted with 2.23 parts of 29 percent hydrogen peroxide to obtain 3.5 parts of the desired sulfoxide as a viscous syrup, showing the expected infrared sulfoxide bands at 9.7–10 microns.

Example 31.—Preparation of o-(3-phenylsulfinyl-propyl)phenol

In the manner of the preceding example, 5 parts of o-(3-phenylthiopropyl)phenol was reacted with 2.67 parts of 29 percent hydrogen peroxide to obtain 4 parts of the desired sulfoxide as a viscous colorless syrup, showing the expected infrared sulfoxide bands at 9.7–10 microns.

Example 32.—Preparation of o-(3-methyl-sulfinyl)-p-cresol

In the manner of the preceding example, 30 parts of o-(3-methylthiopropyl)-p-cresol was reacted with 18 parts of 29 percent hydrogen peroxide to obtain 35 parts of the desired sulfoxide as a light yellowish viscous syrup, showing the expected infrared sulfoxide bands at 9.7–10 microns.

Example 33.—2-(3-methylsulfinylpropyl)-3,4,6-tri-chlorophenol and methyl ether thereof To 10 parts of 2-(3-methylthiopropyl)-3,4,6-trichlorophenol (prepared as described above) in 30 parts of glacial acetic acid was added 4.0 parts of 30 percent hydrogen peroxide at 5–10 percent. After ten hours, the mixture had deposited copious solids. The mixture was partially evaporated and the solids were removed by filtration, and dried in air to obtain 9 parts of colorless crystals, melting point 147–148.5 degrees.

*Analysis.*—Calculated for $C_{10}H_{11}O_2SCl_3$: N.E. 301.5. Found: N.E. 299.

By conversion of this phenol to its sodium salt using equimolar sodium ethoxide in ethanol, isolation of the dry sodium salt by evaporation of the ethanol, and treatment with equimolar methyl sulfate in refluxing methyl ethyl ketone, there was isolated the methyl ether of the above-described phenol as a light tan crystalline solid, melting point 78–78.5 degrees.

*Analysis.*—Calculated for $C_{11}H_{13}O_2SCl_3$: S 10.13. Found: S 10.28.

Example 34.—Preparation of o-(3-mercapto-propyl)phenol

A mixture of 20 parts of o-(3-acetylthiopropyl)phenol, 12 parts of sodium hydroxide and 100 parts of water was refluxed for three hours under a nitrogen atmosphere, then filtered with activated charcoal, and the filtrate acidified by addition of hydrochloric acid. The oil thus liberated was extracted with methylene chloride, the methylene chloride solution was washed and then dried over magnesium sulfate. The solvent was then stripped off and the crude product fractionally distilled to obtain a colorless liquid, boiling point 120–135 degrees (0.05–0.08 millimeter) which exhibited the characteristic mercaptan odor and infrared —SH band at 3.9 microns, as well as the phenolic hydroxyl band at 3 microns.

The same thiol is produced by exposure of a mixture of 10 parts of hydrogen sulfide and 10 parts of o-allyl-phenol plus 0.2 part of azobisisobutyronitrile in a sealed Pyrex pressure vessel (under autogenous pressure of the hydrogen sulfide) to the light from a mercury vapor arc for 20 hours, at 20–30 degrees followed by fractional distillation of the reaction mixture.

Example 35.—Fungicidal activity

Bean plants infested with spores of powdery mildew were sprayed at 0.04 percent conc. with aqueous dispersions of various chemicals of the invention. At a time thereafter when infested unsprayed comparison plants had become severely mildewed, the percentage control of mildewed area on the sprayed plants was estimated, with following results:

| Chemical: | Percent disease control[1] |
|---|---|
| O-(3-acetylthiopropyl)phenol | 50 |
| O-(3-ethylthiopropyl)phenol | 100 |
| O-(dimethoxy thiophosphinylthiopropyl)phenol | 50 |
| O-(diethoxy thiophosphinylthiopropyl)phenol | 75 |
| O-(3-isopropylthiopropyl)phenol | 75 |
| O-(3-methylthiopropyl)-p-cresol | 100 |
| 2-(3-methylthiopropyl)-3,5-dimethylphenol | 100 |
| O-(3-n-butylthiopropyl)phenol | 75 |
| O-(3-tert-butylthiopropyl)phenol | 100 |
| 2-(3-methylthiopropyl)-4-chlorophenol | 100 |
| O-(3-octylsulfinylpropyl)phenol | 50 |
| O-(3-phenylsulfinylpropyl)phenol | 50 |

[1] Approximate percentage reduction of leaf area affected by mildew.

Example 36.—Fungicidal activity

Tomato plants infested with spores of *Alternaria solani*, the causative fungus of Early Blight Disease, were sprayed with aqueous dispersions of various of the compounds of the invention at 0.04 percent concentration. Infested plants were also left unsprayed for comparison. The percent control of the disease (reduction of leaf lesions) was estimated one week later.

| Chemical: | Percent disease control |
|---|---|
| 0-(3-ethylthiopropyl)phenol | 71 |
| 0-(3-acetylthiopropyl)phenol | 79 |
| 0-(dimethoxythiophosphinylthiopropyl)phenol | 92 |
| 0-(diethoxythiophosphinylthiopropyl)phenol | 72 |
| 0-(3-n-butylthiopropyl)phenol | 63 |
| 0-(3-phenylthiopropyl)phenol | 70 |
| 0-(3-benzylthiopropyl)phenol | 66 |
| 0-(3-methylthiopropyl)-p-cresol | 77 |

Example 37.—Acaricidal activity

Red spider mites on nasturtium leaves were sprayed with an 0.1 percent aqueous dispersion of o-(diethoxythoxy-thiophosphinylthiopropyl)phenol. After 24 hours, 99 percent mortality of all mites originally present was observed. At the same concentration malathion produced a 95 percent mortality.

Example 38.—Insecticidal activity

Bean plants infested with third instar larvae of the Mexican bean beetle were sprayed with 0.1% aqueous dispersions of o - (dimethoxythiophosphinylthiopropyl) phenol, and forty-eight hours later were inspected for insect damage. It was found that none of the bean leaves were damaged by larval feeding, and that 60 percent of the larvae were dead and the remainder were in a moribund condition.

Similarly infested but unsprayed bean plants inspected at the same time were found to be substantially defoliated by larvae feeding.

Example 39.—Insecticidal activity

Caged adult houseflies (*Musca domestica*) were sprayed with 1 percent and 0.1 percent aqueous dispersions of various of the compounds of the invention. The percentage knockdown was observed two hours after spraying and the percentage kill 24 hours after spraying, with the following results:

| Compound | Observation | At 1% | At 0.1% |
|---|---|---|---|
| o-(diethoxythiophosphinylthio-propyl)phenol. | 2 hr. KD | 100 | 100 |
| | 24 hr. kill | 100 | 100 |
| o-(dimethoxythiophosphinylthio-propyl)phenol. | 2 hr. KD | 100 | 95 |
| | 24 hr. kill | 100 | 100 |
| o-(3-ethylthiopropyl)phenol | 2 hr. KD | 100 | 100 |
| | 24 hr. kill | 100 | 100 |
| 0-(3-n-octylthiopropyl)phenol | 2 hr. KD | 100 | 85 |
| | 24 hr. kill | 100 | 100 |
| 2-(3-methylthiopropyl)-4-chloro-phenol. | 2 hr. KD | 100 | 0 |
| | 24 hr. kill | 100 | 60 |
| o-(3-butylsulfinylpropyl)phenol | 2 hr. KD | 15 | 0 |
| | 24 hr. kill | 55 | 50 |
| o-(3-octylsulfinylpropyl)phenol | 2 hr. KD | 10 | 0 |
| | 24 hr. kill | 65 | 30 |
| o-(3-phenylsulfinylpropyl)phenol: | 2 hr. KD | 0 | 0 |
| | 24 hr. kill | 45 | 25 |

Example 40.—Insect repellent activity

Leaves of bean plants infested with larvae of the Mexican bean beetle were sprayed with 0.1 percent aqueous dispersions of o-(3-octylthiopropyl)phenol and o-(3-octyl-sulfinylpropyl)phenol, leaving parts of each plant unsprayed. When observed after 48 hours, the larvae were found to have migrated from the sprayed leaves. Although few dead larvae were found, the sprayed leaves were nevertheless completely protected from being eaten by the larvae by the repellant action of the chemicals.

What is claimed is:

1. A method for the control of undesirable pests selected from the group consisting of insects, mites, and fungi which comprises applying to the locus of said pests an effective amount of a composition of the formula

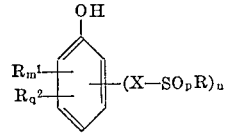

wherein the substituent X is an alkylene radical of from 2 to 8 carbon atoms, the $R^1$ substituent is lower alkyl, the $R^2$ substituent is halogen, R is a substituent selected from the group consisting of hydrogen, hydrocarbyl and acyl, $n$ is an integer from 1 to 2 inclusive, $m$ is an integer from 0 to 4 inclusive, $q$ is an integer from 0 to $5-(m+n)$ inclusive and $p$ is an integer from 0 to 2, inclusive, the integer $p$ is 0 when the substituent R is other than hydrocarbyl, and the sulfur atom is separated from the phenol nucleus by at least two carbon atoms.

2. A method according to claim 1 wherein the substituent X represents alkylene of from 2 to 8 carbon atoms, the $R^1$ substituent is lower alkyl, the $R^2$ substituent is halogen, R is a hydrocarbyl substituent selected from the group consisting of alkyl, alkenyl, cycloalkyl, phenyl, naphthyl, alkyl phenyl and benzyl, said substituents being of 1 to about 20 carbon atoms, wherein $n$ is an integer from 1 to 2 inclusive, $m$ is an integer from 0 to 4 inclusive, $q$ is an integer from 0 to $5-(m+n)$ inclusive, the sum of $m+n+q$ is 1 to 5, and $p$ is an integer from 1 to 2 inclusive, and the sulfur atom is separated from the phenol nucleus by at least two carbon atoms.

3. A method according to claim 2 wherein the composition is of the formula

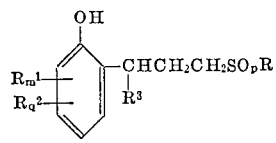

wherein $R^1$ is lower alkyl; $R^2$ is halogen, R is selected from the group consisting of hydrogen, hydrocarbyl, acyl and mixtures thereof; $m$ is from 0 to 4 inclusive; $p$ is from 0 to 2 and is 0 when R is other than hydrocarbyl; $q$ is $4-m$ and $R^3$ is selected from the group consisting of hydrogen, lower alkyl, lower-alkoxymethyl; and 2-(lower-alkoxy) ethyl.

4. A method according to claim 1 wherein the pests treated are fungi and the composition employed is o-(3-ethylthiopropyl) phenol.

5. A method according to claim 1 wherein the pests treated are fungi and the composition employed is o-(3-methylthiopropyl)-p-cresol.

6. A method according to claim 1 wherein the pests treated are fungi and the composition employed is o-(3-tert-butylthiopropyl) phenol.

7. A method according to claim 1 wherein the pests treated are mites and the composition employed is o-(diethoxythiophosphinylthiopropyl) phenol.

8. A method according to claim 1 wherein the pests treated are insects and the composition employed is o-(diethoxythiophosphinylthiopropyl) phenol.

9. A method according to claim 1 wherein the pests treated are insects and the composition employed is o-(3-ethylthiopropyl) phenol.

(References on following page)

References Cited

UNITED STATES PATENTS

| | | | |
|---|---|---|---|
| 2,530,339 | 11/1950 | Mikeska et al. | 260—461 |
| 2,668,768 | 2/1954 | Chenicek | 260—609 |
| 2,828,241 | 3/1958 | Birum | 167—30 |
| 3,088,863 | 5/1963 | Richter | 260—461 |
| 3,193,583 | 7/1965 | Ladd | 260—609 |

ALBERT T. MEYERS, *Primary Examiner.*

D. M. STEPHENS, *Assistant Examiner.*

U.S. Cl. X.R.

260—953; 424—300, 301, 335, 337